United States Patent
Lee et al.

(10) Patent No.: US 9,880,677 B2
(45) Date of Patent: Jan. 30, 2018

(54) TOUCH DISPLAY DEVICE

(71) Applicant: LG DISPLAY CO., LTD., Seoul (KR)

(72) Inventors: Jong-Hyun Lee, Gumi-si (KR); Hong-Chul Kim, Gunpo-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/563,115

(22) Filed: Dec. 8, 2014

(65) Prior Publication Data

US 2015/0160761 A1  Jun. 11, 2015

(30) Foreign Application Priority Data

Dec. 9, 2013  (KR) .................... 10-2013-0152280

(51) Int. Cl.
*G06F 3/044* (2006.01)
*G06F 3/041* (2006.01)

(52) U.S. Cl.
CPC .............. *G06F 3/044* (2013.01); *G06F 3/041* (2013.01); *G06F 3/0412* (2013.01); *G06F 3/0416* (2013.01)

(58) Field of Classification Search
CPC ........ G06F 3/044; G06F 3/041; G06F 3/0412; G06F 3/0416
See application file for complete search history.

(56) References Cited

U.S. PATENT DOCUMENTS

| | | | | |
|---|---|---|---|---|
| 7,463,238 | B2* | 12/2008 | Funkhouser | G06F 1/1601 345/107 |
| 8,823,754 | B2* | 9/2014 | Koyama | G06F 3/0412 345/100 |
| 2006/0209047 | A1* | 9/2006 | Jeong | G06F 3/03545 345/173 |
| 2008/0225219 | A1* | 9/2008 | Saito | G02F 1/1345 349/150 |
| 2009/0167718 | A1* | 7/2009 | Lee | G06F 3/0416 345/174 |

(Continued)

FOREIGN PATENT DOCUMENTS

| | | |
|---|---|---|
| CN | 102736300 A | 10/2012 |
| CN | 103424909 A | 12/2013 |

(Continued)

OTHER PUBLICATIONS

Chinese First Office Action, Chinese Application No. 201410740092.7, dated Mar. 20, 2017, 18 pages.

*Primary Examiner* — Lun-Yi Lao
*Assistant Examiner* — Kelly Hegarty
(74) *Attorney, Agent, or Firm* — Fenwick & West LLP

(57) ABSTRACT

A touch display device includes: a touch display panel including a display region and a non-display region; gate lines and data lines crossing each other to define a pixel region in the display region; a thin film transistor in the pixel region and connected to the corresponding gate and data lines; a touch block having a plurality of pixel regions; a touch line connected to the touch block; a touch display driver IC that supplies a gate signal, a data signal and a common voltage to the pixel region, and supplies a touch scan signal to the touch block; a flexible printed circuit board that transfers timing signals and image data from an external system to the touch display driver IC; and a memory mounted on the flexible printed circuit board.

5 Claims, 5 Drawing Sheets

(56) References Cited

U.S. PATENT DOCUMENTS

| | | | |
|---|---|---|---|
| 2010/0164906 A1 | 7/2010 | Fukunaga et al. | |
| 2013/0147724 A1* | 6/2013 | Hwang | G06F 3/0412 345/173 |
| 2013/0147735 A1* | 6/2013 | Kim | G06F 3/041 345/173 |
| 2013/0188104 A1* | 7/2013 | Aoki | G06F 3/0412 349/12 |
| 2013/0241874 A1* | 9/2013 | Long | G06F 3/0418 345/174 |
| 2013/0314343 A1* | 11/2013 | Cho | G06F 3/0412 345/173 |
| 2015/0031326 A1* | 1/2015 | Begin | H04W 24/08 455/405 |
| 2015/0097802 A1* | 4/2015 | Kim | G06F 3/044 345/174 |
| 2015/0214376 A1* | 7/2015 | Koezuka | G02F 1/1368 257/43 |

FOREIGN PATENT DOCUMENTS

| | | |
|---|---|---|
| EP | 2602697 A2 | 6/2013 |
| JP | 2013-084168 A | 5/2013 |
| KR | 1020050123108 A | 12/2005 |
| KR | 1020130109321 A | 10/2010 |
| KR | 1020110086060 A | 7/2011 |
| KR | 1020110092778 A | 8/2011 |
| KR | 1020110112128 A | 10/2011 |
| KR | 1020110052423 A | 5/2012 |
| KR | 101165456 B1 | 7/2012 |
| TW | 201319943 A | 5/2013 |
| TW | 201346876 A | 11/2013 |

\* cited by examiner

TOUCH DISPLAY DEVICE

This application claims the benefit of Korean Patent Application No. 10-2013-0152280, filed on Dec. 9, 2013, which is hereby incorporated by reference for all purposes as if fully set forth herein.

BACKGROUND OF THE INVENTION

Field of the Invention

The present disclosure relates to a touch display device. More particularly, the disclosure relates to a touch display device including a touch driver IC integrated with a display driver IC.

Discussion of the Related Art

With an information-based society, the display field has advanced rapidly. To meet this rapid growth, flat panel display (FPD) devices having thin profile, light weight and low power consumption, such as a liquid crystal display (LCD) device, a plasma display panel (PDP), an organic light emitting diode (OLED) display device and a field emission display (FED) device, have been developed.

The FPD device is operated in response to a stimulation to an outer surface of a display panel, i.e., a touch to provide convenience to a user. In other words, the FPD provides a function of a touch panel together.

The touch panel is used as an output means that displays an image, and also is widely used as an input means that receives a user's instruction through touching a creation portion of the displayed image.

In other words, when a user touches a touch panel watching an imaged displayed on a display panel, the touch panel detects location information of the touched portion. The detected location information is compared with location information of the image, and thus a user's instruction is recognized.

The touch panel may be categorized into a resistive type, a capacitive type, a IR (infrared ray) type, and a SAW (surface acoustic wave) type. A capacitance-sensing type touch panel or pressure-sensing type touch panel is used as a representative touch panel.

This touch panel is manufactured by an add-on method to attach a touch panel on a display panel, or is manufactured by an on-cell method or in-cell method to form a touch panel on a substrate of a display panel and integrate a touch panel and a display panel.

A touch display device using the touch panel includes a display driver IC to display image, and a touch driver IC to sense touch.

FIG. 1 is a view illustrating an add-on type touch display device according to the related art.

Referring to FIG. 1, the add-on type touch display device includes a display panel 1 and an touch panel 11.

The display panel 1 includes a plurality of gate lines and a plurality of data lines crossing each other to define a plurality of pixel regions which are in a display region AA and each include a thin film transistor, a common electrode and a pixel electrode, a display driver IC (D-IC) 7 to input signals to the gate and data lines, first link lines 5 connecting the display region AA with the D-IC 7, a first flexible printed circuit board (FPC) 10 transferring image data and timing signals such as synchronization signals from an external system to the D-IC 7, and first connection lines 9 connecting the D-IC 7 with the first FPC 10.

The touch panel 11 includes a touch region TA including a plurality of electrode patterns to sense a touch, a touch driver IC (T-IC) 17 which generates touch signals and applies the touch signals to the electrode patterns, then receives touch sensing signals according to the applied touch signals, and senses a touch input location in the touch region TA, second link lines 15 connecting the electrode patterns with the T-IC 17, and a second flexible printed circuit board (FPC) 20 which the T-IC 17 is installed on and receives signals from the external system.

The display panel 1 and the touch panel 11 are attached to each other to manufacture the touch display device.

It is difficult to make the add-on type touch display device thin-profiled because the electrode patterns are formed in the touch panel 11. To solve this problem, proposed is an in-cell type in which electrode patterns such as driving electrodes and sensing electrodes are formed in a display panel.

FIG. 2 is a view illustrating an in-cell type touch display device according to the related art.

An in-cell type touch display device may be categorized as a self-capacitance type or a mutual capacitance type. The mutual-capacitance type is explained hereinafter.

Referring to FIG. 2, the in-cell type touch display device includes a touch display panel 31 and a D-IC 37 and T-IC 43.

The touch display panel 31 is a flat display panel, for example, an LCD panel, an OLED panel, or FED panel.

In case of the LCD panel, the touch display panel 31 includes a lower substrate, an upper substrate and a liquid crystal layer between the lower substrate and the upper substrate.

The lower substrate includes a plurality of gate lines and a plurality of data lines crossing each other to define a plurality of pixel regions in a display region AA, and a thin film transistor, a pixel electrode connected to the thin film transistor, and a common electrode in each pixel region.

Further, the lower substrate includes a touch region TA where a plurality of driving electrodes and a plurality of sensing electrodes are formed using common electrodes or touch lines. The driving electrode may cover pixel regions on a row line parallel with the gate line, and the sensing electrode may cover pixel regions on a column line parallel with the data line.

The touch display device includes a display driver IC (D-IC) 37 to input signals to the gate and data lines, third link lines 35 connecting the display region AA with the D-IC 37, a third flexible printed circuit board (FPC) 40 transferring image data and timing signals such as synchronization signals from an external system to the D-IC 37, and second connection lines 39 connecting the D-IC with the third FPC 40. The third link lines 35 and the second connection lines 39 are formed on the lower substrate, and the D-IC 37 is mounted on the lower substrate.

The touch driver IC (T-IC) 43 sensing a touch input location is installed on the third FPC 40.

The lower substrate is attached to an upper substrate, which may includes a color filter and a black matrix, with the liquid crystal layer therebetween.

In the in-cell type touch display device, driving electrode and the sensing electrode are formed near the gate line and the data line, and this influences a capacitor formed between the driving electrode and the sensing electrode. In detail, a voltage variation of the gate line near the data line influences the data line, and a variation of the data line causes a coupling with an adjacent driving electrode.

Further, a sensing electrode near the data line is influenced by a parasitic capacitor formed by a variation of the data line, and thus a RC (resistive-capacitive) delay increases. In other words, a touch precision is reduced due to a coupling interference, and a response speed is reduced by an influence of a parasitic capacitor.

In case of the in-cell type touch display device configured in a self-capacitance type, common electrodes do not form both driving electrodes and sensing electrodes. A group of common electrodes in a predetermined region define a touch electrode, and touch electrode lines are independently selected from the touch electrode.

Considering a number "n" of touch electrodes in a row direction and a number "m" of touch electrodes in a column direction, a number "n*m" of line channels is required.

Accordingly, the T-IC 43 needs a number "n*m" of actual channels. If a number of channels of the T-IC 43 is lacking, a plurality of T-ICs 43 is required, and in this case, the third FPC 40 having the T-IC 43 thereon increases in size and is complicated in wiring arrangement.

Instead of using the plurality of T-ICs 43, a multiplexer (MUX) may be embedded in the D-IC 37. However, this causes an increase of size of the D-IC 37 and increase in cost. Further, the third FPC 40 increases in size and is complicated in wiring arrangement.

Besides the above problems, since the touch display device of the related art uses both the D-IC and the T-IC, production cost increases, and noise between the D-IC and T-IC and their peripheral elements (e.g., wirings) occurs.

SUMMARY OF THE INVENTION

Accordingly, the present invention is directed to a touch display device that substantially obviates one or more of the problems due to limitations and disadvantages of the related art.

An advantage of the present invention is to provide a touch display device that can reduce production cost and noise.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, a touch display device includes: a touch display panel including a display region and a non-display region; gate lines and data lines crossing each other to define a pixel region in the display region; a thin film transistor in the pixel region and connected to the corresponding gate and data lines; a touch block having a plurality of pixel regions; a touch line connected to the touch block; a touch display driver IC that supplies a gate signal, a data signal and a common voltage to the pixel region, and supplies a touch scan signal to the touch block; a flexible printed circuit board that transfers timing signals and image data from an external system to the touch display driver IC; and a memory mounted on the flexible printed circuit board.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to exemplary embodiments, examples of which are illustrated in the accompanying drawings. The same reference numbers may be used throughout the drawings to refer to the same or like parts.

In the below embodiment, for the purpose of explanation, an LCD device is described as an example of a touch type display device. However, it should be understood that other type flat panel display devices such as OLED device, FED device, PDP device and so on may be used as the touch type display device.

Figure 1:
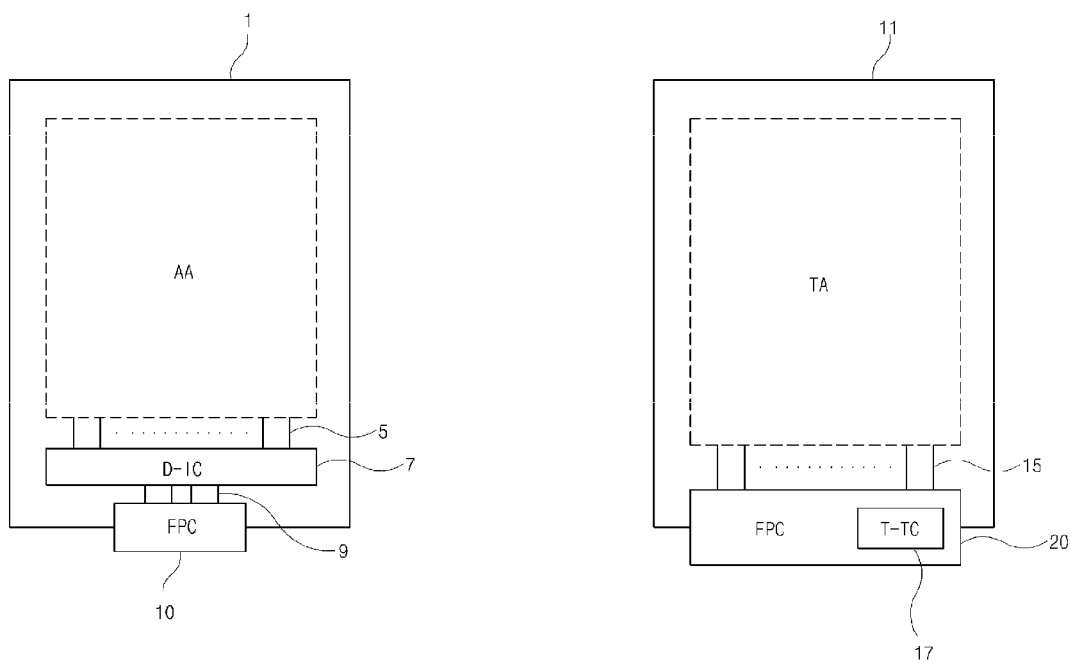
FIG. 1 is a view illustrating an add-on type touch display device according to the related art.
Figure 2:
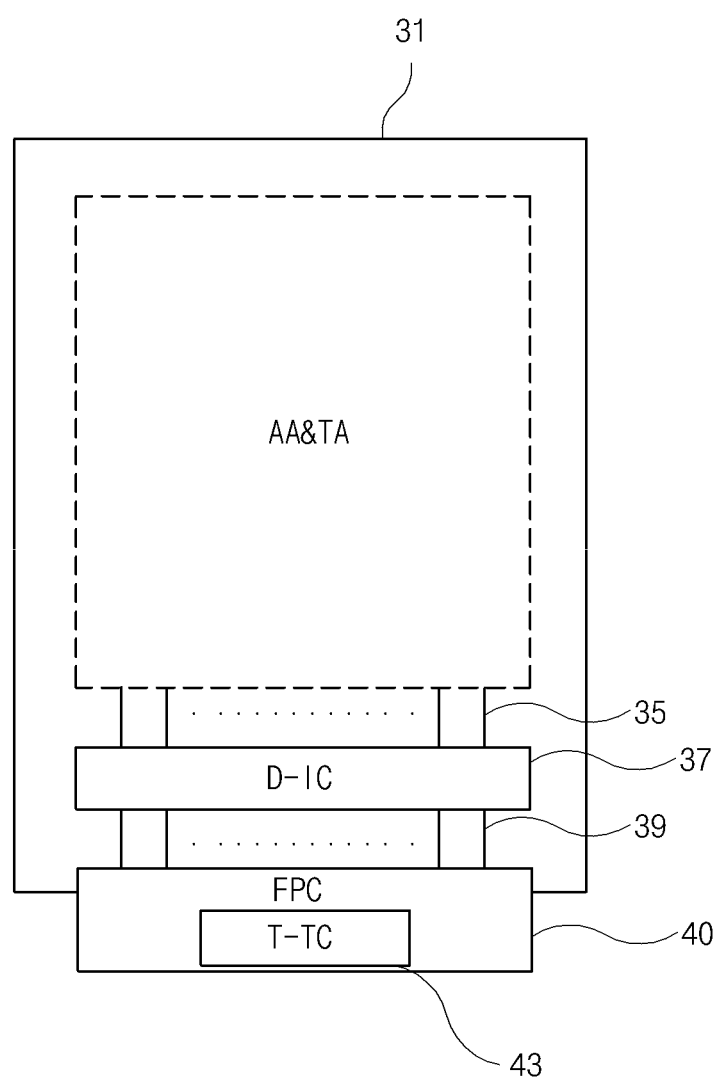
FIG. 2 is a view illustrating an in-cell type touch display device according to the related art.
Figure 3:
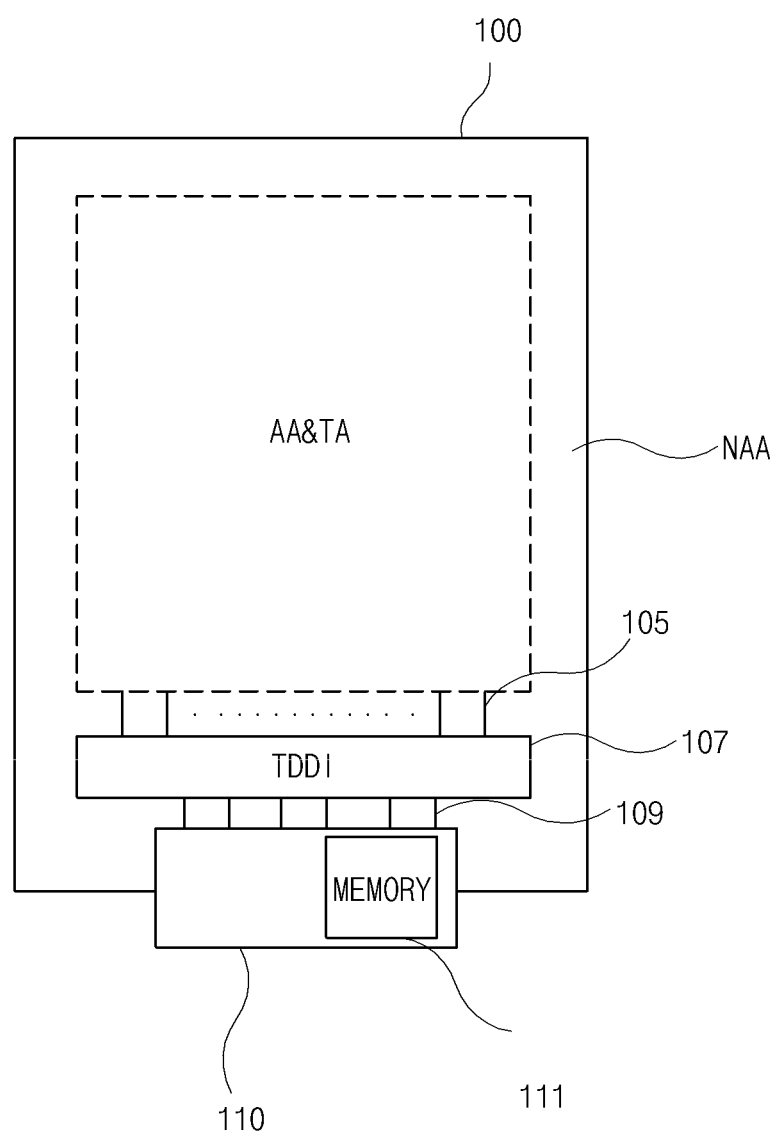
FIG. 3 is a view illustrating a touch display device according to an embodiment of the present invention.

FIG. 3 is a view illustrating a touch display device according to an embodiment of the present invention.

Referring to FIG. 3, the touch display device includes a panel 100, a touch display driver IC (TDDI) 107, and a flexible printed circuit board (FPC) 110.

The panel 100 may be a in-cell type touch display panel i.e., a integration panel of a display panel and a touch panel. The touch display panel 100 functions to sense a user's touch location and display an image as well. In the touch display panel 100, common electrodes used to display an image are divided and are used for touch electrodes so that a capacitance between the touch electrode and a user's input is formed. Accordingly, a change amount of a capacitance according to a user's touch input is sensed so that a touch sensing is conducted. In other words, the touch display panel 100 is a self capacitance type touch display panel.

The touch display panel 100 includes a display region AA and a non-display region NAA surrounding the display region AA.

Figure 5:
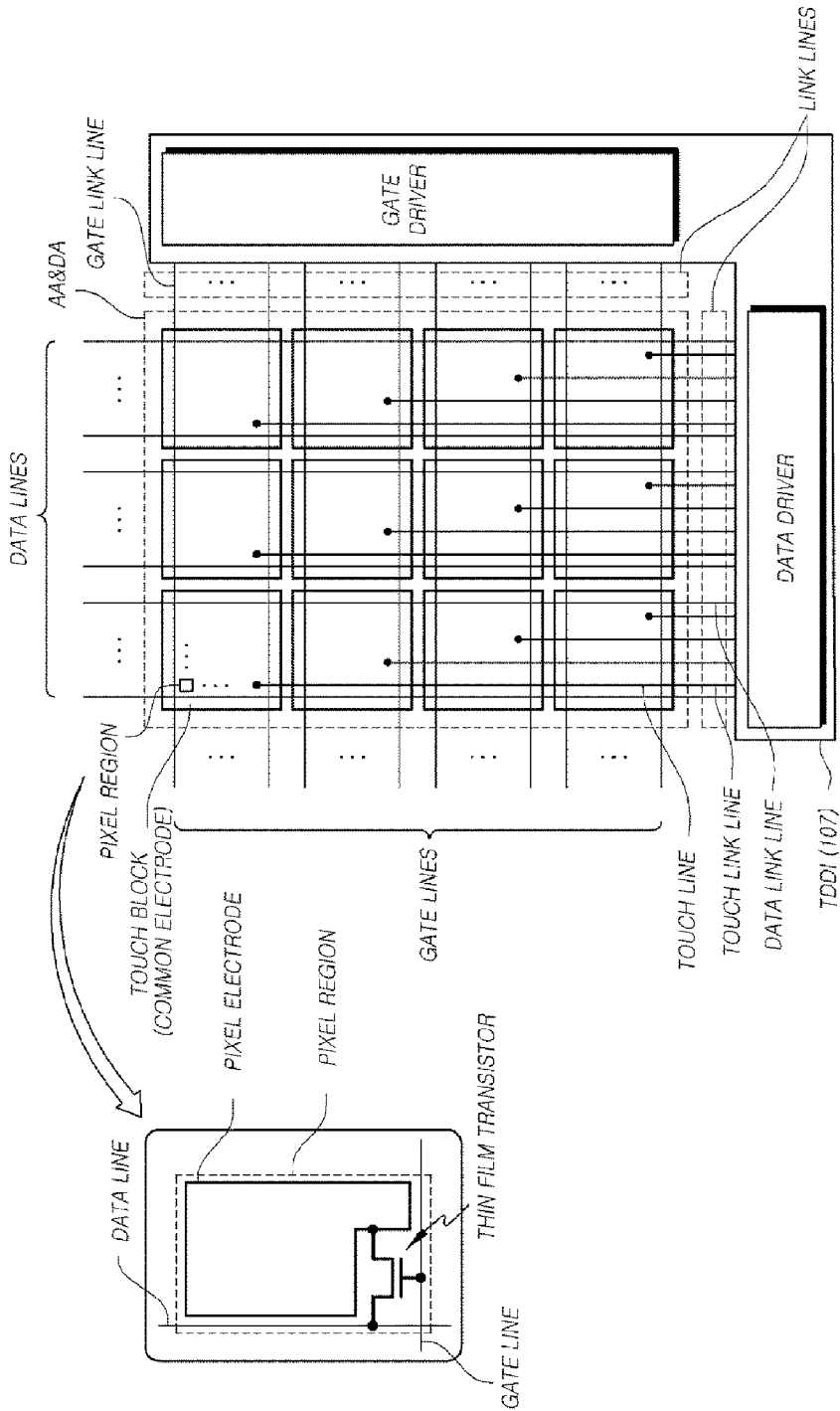
FIG. 5 is a view illustrating a structure of a touch display device in more detail according to an embodiment of the present invention.

The touch display panel 100 may include lower and upper substrates and a liquid crystal layer therebetween. In this case, as shown in FIG. 5, the lower substrate may include a plurality of gate lines and a plurality of data lines crossing each other to define a plurality of pixel regions in a matrix form in a display region AA, and a thin film transistor, a pixel electrode connected to the thin film transistor, and a common electrode in each pixel region. The pixel electrode is supplied with a data voltage, and operates liquid crystal molecules with the common electrode. The upper substrate may include a color filter and a black matrix.

Polarizing plates may be attached on outer surfaces of the lower substrate and the upper substrate, respectively. Alignment layers may be formed on inner surfaces of the lower substrate and the upper substrate to align liquid crystal molecules. Column spaces may be formed between the lower substrate and the upper substrate to maintain a cell gap between the lower substrate and the upper substrate.

A plurality of touch blocks, for example, m touch blocks are defined in the touch display panel 100, and each touch block may have a plurality of pixel regions (where m is an integer of 2 or more), as shown in FIG. 5. The common electrode may be patterned corresponding to the touch block.

Each touch block may be operated by the corresponding common electrode for a touch driving time. In other words, the common electrode of the touch block is operated as a touch electrode to sense a touch position according to a touch scan signal supplied from the TDDI 107 for the touch driving time.

The touch display panel 100 may include n link lines 105 (where n≥m), which connect the m touch blocks with the TDDI 107. Accordingly, common voltages and touch scan signals output from the TDDI 107 are supplied to the touch blocks through the link lines 105. Further, touch sensing signals received from the touch blocks are supplied to the TDDI 107 through the link lines 105.

The link lines 105 are connected with the gate lines and the data lines and transfer gate signals and data signals to the pixels.

The touch scan signals are signals that are generated from the TDDI 107 and transferred to the touch blocks. The touch sensing signals are signals that are generated between a user's touch input and the touch blocks according to the touch scan signals, and transferred to the TDDI 107.

The TDDI 107 applies the gate and data signals to the pixels or the touch scan signals to the touch blocks through the link lines 105 according to driving modes.

In other words, the link lines 105 may include gate link lines and data link lines connected to the gate lines and the data lines to apply the gate and data signals to the pixels, and touch link lines connected to touch lines to apply the touch scan signals to the touch blocks and transfer the touch sensing signals to the TDDI 107, as shown in FIG. 5. The touch lines may be formed parallel with the data lines and be connected with the touch blocks, as shown in FIG. 5.

Accordingly, the touch lines do not need to be in a non-display region NAA, and thus a bezel region can be reduced.

The TDDI 107 is explained in further detail with reference to FIG. 4.

Figure 4:
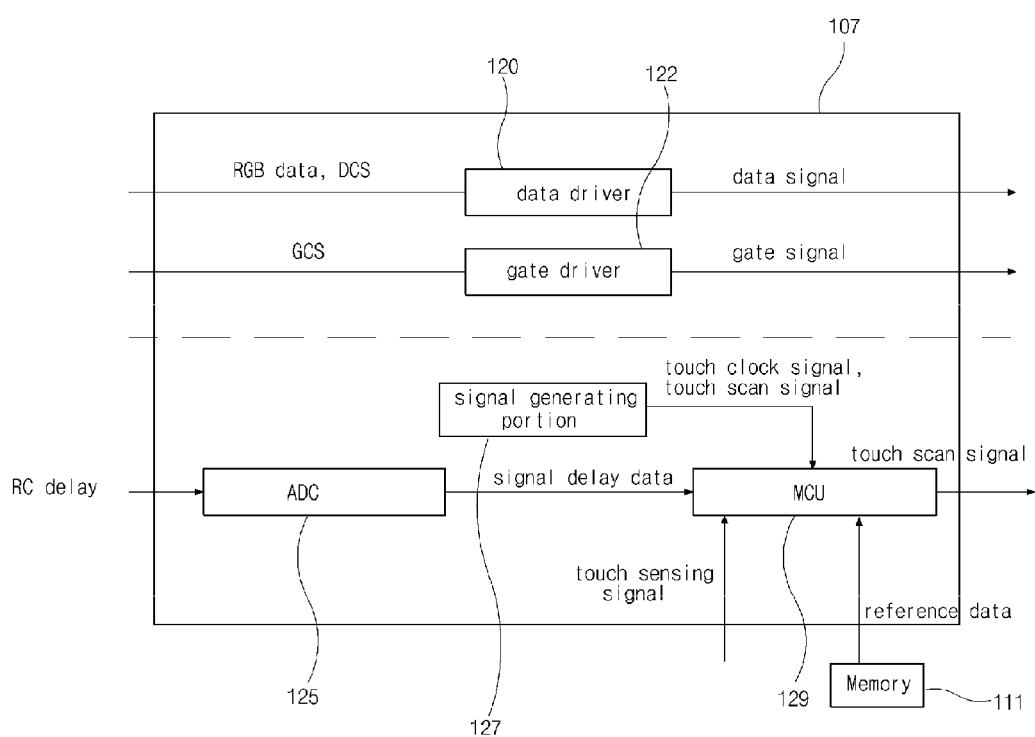
FIG. 4 is a view illustrating configuration of a TDDI according to an embodiment of the present invention.

FIG. 4 is a view illustrating a configuration of a TDDI according to an embodiment of the present invention.

Referring to FIG. 4, the TDDI 107 includes a data driver 120, a gate driver 122, an analog-to-digital converter (ADC) 125, a signal generating portion 127, and a microcontroller unit (MCU) 129.

The data driver 120 selects a reference voltage corresponding to each of image data input RGB data from a timing controller in response to data control signal DCS input from the timing controller, and outputs the selected reference voltage as a data signal to the touch display panel 100.

The gate driver 122 sequentially outputs gate signals to the gate lines in response to a gate control signal GCS input from the timing controller.

Accordingly, the gate lines are sequentially selected, and the thin film transistors of the pixels connected to the selected gate line are turned on. When the thin film transistors of the pixels are turned on, the data signals are applied to the pixels.

The ADC 125 converts RC delay of signal on the touch line into a signal delay data in digital form, and transfers the signal delay data to the MCU 129.

The RC delay occurs due to a resistance of the touch line itself and a parasitic capacitance by overlap between the touch line and the gate line, and causes malfunction of the touch block. Accordingly, the RC delay is converted as the signal delay data by the analog-to-digital converter 125, and then supplied to the MCU 129.

The signal generating portion 127 generates the touch scan signal supplied to the touch block, and a touch clock signal. The touch scan signal and the touch clock signal are transferred to the MCU 129, and the MCU 129 decides a touch using the touch scan signal and the touch clock signal.

Regarding the touch decision, the touch scan signals having a predetermined waveform are applied to the m touch blocks, and the touch sensing signals are generated at the m touch blocks according to a user motion. The touch scan signals and the touch sensing signals are calculated in the MCU 129 to decide whether a touch happens or not.

In this regard, the touch clock is a signal to compare a difference between the touch scan signal and the touch sensing signal. For example, a number of touch clocks for the touch scan signal is compared with a number of touch clocks for the touch sensing signal, and based on this, it is decided whether a touch happens or not.

A number of touch clocks for each of the touch scan signal of a predetermined waveform and the touch sensing signal of a predetermined waveform may be obtained by counting a number of touch clocks until a falling point of a logic high state to a logic low state for each of the touch scan signal and the touch sensing signal.

The MCU 129 applies the touch scan signals, which are supplied from the signal generating portion 127, to the corresponding touch blocks, and decides the occurrence of a touch by comparing the touch scan signal with the touch sensing signal with respect to the touch clocks. Further, the MCU 129 compares the signal delay data from the ADC 125 with reference data from a memory 111, then applies a compensation value for a signal delay data to the touch scan signal, and then outputs the compensated touch scan signal from the MCU 129.

Referring back to FIG. 3, the FPC 110 transfers timing signals, such as a data enable signal (DE), a horizontal synchronization signal (HSY), a vertical synchronization signal (VSY) and a data clock signal (DCLK), which are supplied from the external system, to the TDDI 107. Connection lines 109 are formed between the FPC 110 and the TDDI 107 to transfer the timing signals.

The FPC 110 may include the memory 111. The memory 111 may includes a touch firmware storing portion that stores a firmware for touch driving, a reference data storing portion that stores the reference data regarding signal delay, and a driver firmware storing portion that stores a driver firmware for image output.

In the reference data storing portion, the reference data may be stored in a table form, and the MCU 129 reads the reference data.

The touch firmware in the touch firmware storing portion may be loaded onto the TDDI 107 according to a control signal supplied from the external system. At the same time, the touch firmware may be loaded onto the MCU 129.

The TDDI 107 may generate the touch scan signal using the loaded touch firmware, generate gate and data signals using the loaded driver firmware, and controls the touch display panel 100 to be operated in an image display mode for a display time or touch driving mode for a touch time according to a control signal supplied from the external system.

The memory 111 and the TDDI 107 may communicate with each other in a SPI (serial to peripheral interface) communication method. In this case, four lines for the SPI communication, and one line for loading the reference data i.e., total five connection lines 109 to transfer signals between the memory 111 and the TDDI 107 are required.

As described above, the touch display device of the embodiment uses the touch display driver IC that is an integration of a display driver IC and a touch driver IC. Thus, production cost can be reduced.

Further, a signal delay is compensated for, and thus noise can be reduced and quality can be improved.

Further, the link lines connecting the touch blocks with the display driver IC do not need to be formed at the side region of the non-display region. Thus, a bezel region can be reduced.

Further, the memory is mounted at the flexible printed circuit board. Thus, a number of connection lines can be reduced, and a size of the flexible printed circuit board can be reduced.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A touch display device, comprising:
    a touch display panel including a display region and a non-display region;
    gate lines and data lines crossing each other to define a pixel region in the display region;
    a thin film transistor in the pixel region and connected to corresponding gate and data lines;
    a touch block having a plurality of pixel regions;
    a touch line connected to the touch block;
    a touch display driver IC that supplies a gate signal, a data signal and a common voltage to the pixel region, and supplies a touch scan signal to the touch block, the touch display driver IC comprising a single integrated circuit;
    a flexible printed circuit board that transfers timing signals and image data from an external system that is external to the touch display device to the touch display driver IC;
    a memory mounted on the flexible printed circuit board, the memory including a touch firmware storing portion storing firmware for touch driving, a reference data storing portion storing reference data, and a driver firmware storing portion storing driver firmware for image output;
    connection lines connected between the touch display driver IC and the flexible printed circuit board for communication between the touch display driver IC and the memory on the flexible printed circuit board;
    link lines connected between the touch display drive IC and the display region, the link lines including a touch link line connected to the touch line,
    wherein the touch display drive IC supplies the touch scan signal to the touch block through the touch link line, and the touch display drive IC receives a touch sensing signal from the touch block through the same touch link line, the touch sensing signal being generated responsive to a touch input on the touch block according to the touch scan signal, and the touch display drive IC determines whether or not the touch input on the touch block occurred.

2. The device of claim 1, wherein the touch line is parallel with the data lines.

3. The device of claim 1, wherein the touch display driver IC includes:
    a data driver that selects a reference voltage corresponding to the image data input thereto in response to a data control signal, and outputs the selected reference voltage as the data signal to the data lines;
    a gate driver that outputs a gate signal in response to a gate control signal to the gate lines;
    a signal generating portion that generates the touch scan signal and a touch clock signal;
    an analog-to-digital converter that converts a RC delay of signal, which is caused due to a resistance of the touch line and a parasitic capacitance between the touch line and the gate lines, into a signal delay data; and
    a microcontroller unit that decides whether a touch occurs or not, compares the signal delay data with the reference data stored in the memory, compensates for the touch scan signal according to the compared result, and supplies the compensated touch scan signal to the touch block.

4. The device of claim 3,
    wherein the link lines further include a gate link line and a data link line connected to the gate lines and the data lines, respectively, and
    wherein the connection lines include four lines for a SPI communication between the touch display driver IC and the memory, and one line for loading the reference data onto the microcontroller unit.

5. The device of claim 1, wherein the touch display driver IC and the memory communicate with each other in a SPI communication method.

* * * * *